July 27, 1926.
S. SNYDER
WHEAT CRACKING MACHINE
Filed Sept. 26, 1924
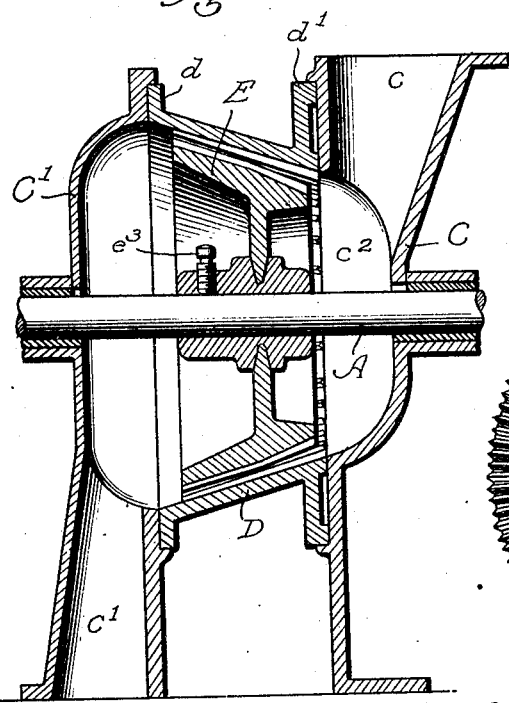
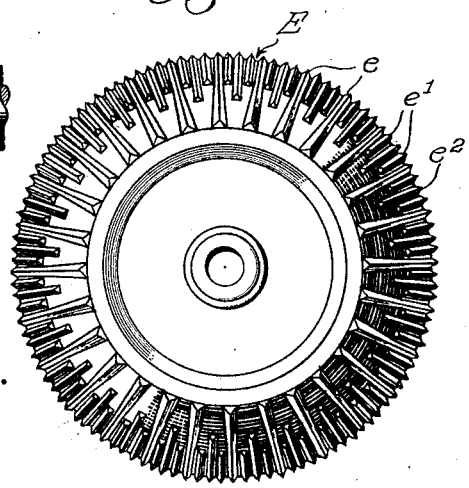
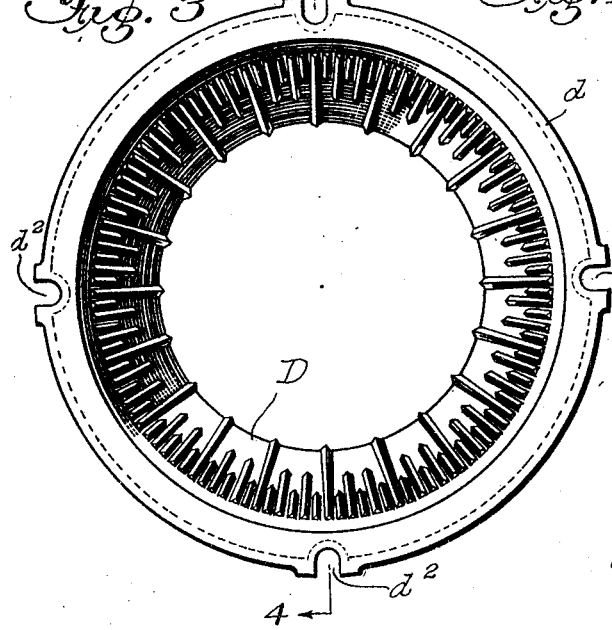
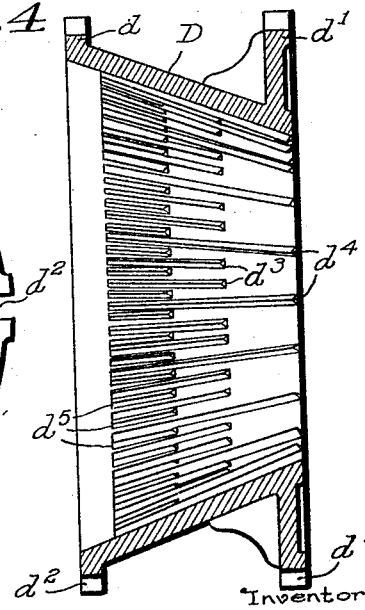

Patented July 27, 1926.

1,593,854

UNITED STATES PATENT OFFICE.

SIMON SNYDER, OF MUNCY, PENNSYLVANIA, ASSIGNOR TO SPROUT, WALDRON & CO., OF MUNCY, PENNSYLVANIA, A CORPORATION OF PENNSYLVANIA.

WHEAT-CRACKING MACHINE.

Application filed September 26, 1924. Serial No. 740,118.

This invention relates to machines for reducing grain, and more particularly to machines for cracking wheat.

The main object of the invention is to provide a simple, efficient and durable machine for reducing wheat to a comparatively coarse or cracked condition with a minimum percentage of fine material. Other objects are to provide a machine of the character referred to combining in its construction simplicity, ease of adjustment to adapt the machine to reduce kernels of wheat to a greater or less degree, as desired, and to adapt the different parts of the machine to be easily removed and replaced in case any of the working parts become worn or broken so as to require substitution of a new part therefor.

The invention will first be hereinafter more particularly described, with reference to the accompanying drawings, which are to be taken as a part of this specification, and then pointed out in the claims at the end of the description.

In said drawings, Fig. 1 is a vertical longitudinal sectional view of a portion of a wheat-cracking machine embodying my invention;

Fig. 2 is an end view of the conical toothed or ribbed inner rotary member of the cracking devices;

Fig. 3 is an end view of the toothed or ribbed outer casing member of said cracking devices, viewed from the larger end thereof, and Fig. 4 is a vertical sectional view of said casing member.

Referring to said drawings, in which the same reference characters are used to denote corresponding parts in different views, the letter A denotes a driving shaft having fixed thereon a peripherally-toothed grain cracking member arranged within an internally-toothed combined grain cracking and casing member; said shaft being journalled in suitable bearings provided therefor on upright members C and $C^1$ of the machine frame or casing, and to which rotary motion may be imparted by a belt or any suitable gear connection with a driven shaft; said casing consisting of the aforesaid members C and $C^1$, and an intermediate combined grain cracking and casing member D having the form of the frustum of a hollow cone and interiorly toothed for co-operation with a peripherally toothed grain cracking member E of similar cone-shaped form carried by the shaft A within said member D, and revoluble with said shaft, the member C having secured thereto or formed integrally therewith a hopper $c$, and the member $C^1$ having preferably integral therewith at its lower end a discharge spout $c^1$, said parts C and $C^1$ being provided with laterally projecting apertured lugs or flanges on the lower ends thereof to receive suitable fastening bolts for securing them to the floor of a building in spaced relation to adapt them to support therebetween said casing member or shell D of the grain cracking devices. To this end said members C and $C^1$ are suitably recessed in their confronting sides or faces to receive correspondingly shaped radially projecting flanges $d$ and $d^1$ on opposite ends of the casing member D. The peripheral flanges $d$ and $d^1$ are preferably of circular form and adapted to fit correspondingly shaped recesses in the confronting faces or sides of the casing members C and $C^1$; and said flanges are formed or provided with open-ended slots $d^2$ to receive fastening bolts for securing the toothed casing member D to the machine frame or casing in such manner that it may be easily removed and replaced when the toothed surface thereof becomes worn or broken. The casing member D, as shown, is formed or provided on its inner periphery with teeth or ribs of the form shown in Figs. 3 and 4, which are designed to co-operate with a similarly peripherally toothed surface of an inner, rotary member E for cracking wheat or other grain more or less finely, as desired, by adjusting and securing the toothed surfaces of the rotary and stationary members at a greater or less distance apart.

The casing member C is preferably formed or provided with a substantially concave central portion $c^2$ to provide an annular open space around the driving shaft A for grain to enter freely between the toothed surfaces of the rotary and stationary grain-reducing or cracking devices at the smaller end of the cone and escape in reduced condition through the discharge spout at the larger end of the cone, while the casing member $C^1$ is formed or provided with a concave portion facing and enlarging toward the larger end of the cone, so as to provide a free space around the driving shaft for the passage of material from between the toothed surfaces of the cracking devices to the discharge spout; said annular space being co-extensive with and facing the smaller end of said stationary grain cracking member D substantially flush with its inner toothed surface.

The rotary member E is formed or provided on its inclined peripheral surface with multiple annular series of ribs or teeth, preferably arranged in groups of five, each group comprising a pair of long ribs $e$, which extend entirely across the peripheral surface of the cone longitudinally thereof, a pair of short ribs $e^1$, arranged along the margin of said inclined surface at the larger end thereof, between each pair of long ribs, and a medial rib $e^2$ of less length than the longer ribs but longer than the short ribs $e^1$, arranged about midway between each of the longer ribs and between the pair of short ribs, as shown in Fig. 2 of the drawings. These ribs are preferably of triangular form in cross-section and taper from the smaller end of the cone toward the larger end thereof gradually enlarging in cross-sectional area toward the smaller end of the cone, and each pair of ribs converge slightly toward the smaller end of the cone. They are of various lengths, as described, to compensate for their convergence and to allow the proper entry of the stock to be reduced between the rotary and stationary members. The conical rotary member E is arranged within and surrounded by the toothed casing member D, as shown in Fig. 1 of the drawings, and may be adjustably secured on the shaft A by any suitable means, such as a spline and groove connection or a set-screw $e^3$, screwed into an interiorly threaded hole in the hub of said rotary member so as to bear upon the shaft A sufficiently tightly to cause the member E to rotate therewith. Said casing member D is formed or provided with multiple series of ribs or teeth similar to the ribs or teeth on the periphery of the rotary conical member E, and of substantially triangular form in cross-section, and tapering toward the larger end of the cone. In this instance, pairs of medium-length ribs $d^3$ are arranged between pairs of long ribs $d^4$ and between each of the longer ribs and an adjacent medium-length rib, and also between each pair of medium-length ribs there is a short rib $d^5$ of a marginal series, thus forming groups of seven, though a greater or less number may comprise a group. Each pair of ribs converge slightly toward the smaller end of the cone, as described with reference to the teeth on the rotary member of the cracking devices.

It will be observed that the ribs or teeth on both the stationary interiorly-toothed casing member and on the exteriorly-toothed rotary member are arranged in annular series of different lengths and extend along substantially parallel lines at an angle to the axis of the shaft, and that in cross-section said ribs or teeth are in the form of equi-lateral triangles so as to present oppositely beveled or inclined surfaces which are alike on both sides and the rotary conical member can be rotated in either forward or backward direction, so that when the teeth become worn or dull by rotation in one direction the motion can be reversed and the teeth will have the same cutting edges as before, thereby presenting a keen cutting edge for the continued efficiency of the machine, and by changing the motion the teeth can be worn down to nearly the base before it becomes necessary to substitute a new part.

In operation, the whole wheat enters the annular opening or space between the toothed surfaces of the rotary and stationary cracking members at the smaller end of the cone and by rotation of the inner cone and centrifugal force the grains of wheat are crushed or cracked and carried from the small end of the cone to the larger end thereof and discharged through the spout $c^1$ in suitably cracked condition. A kernel of wheat, being approximately ellipsoidal in shape, with its major axis about twice as great as the minor axis and being small as compared with the length and cross-section of the ribs of the cracking members of the machine, has ample opportunity of being turned over perhaps many times while passing through the machine. Now, suppose that the kernel at some point along its path through the machine occupies such a position that its major axis lies in a plane approximately at right-angles to the axis of the cone; that is, one end of it projects beyond the sharp edge of a rib on the casing member. The result is that the kernel is cut in two by a rib on the revolving cone. Of course, granules may be produced smaller in size than the small diameter of the kernel if the cracking parts are close enough together. The result of this operation is a product of practical uniformity with a minimum percentage of fine material.

It will be observed that the cutting edges of the teeth of the grain reducing devices are more widely separated at the smaller end of the cone than at the larger end thereof as shown in Fig. 1, so as to facilitate the entrance of grain between the toothed surfaces of the revolving and stationary members. This is accomplished by inclining the cutting edges of the teeth of the conical member to a greater extent from a point about midway thereof to the smaller end of the cone than from said intermediate point to the larger end of the cone. By adjusting the conical member along the length of the driving shaft, the space between the toothed surfaces of the conical and casing members may be increased or decreased at will for reducing or cracking the grains of wheat to a greater or less extent as desired in the operation of the machine.

Having thus described my invention, what I claim as new and desire to secure by Letters Patent of the United States, is:

1. A grain cracking machine comprising upright frame and casing members arranged in separated relation and having concave confronting surfaces carrying centrally disposed shaft bearings; one of said members having a hopper thereon and the other provided with a discharge spout, a shaft journaled in said bearings and having secured thereon and revoluble therewith a conical exteriorly-toothed grain cracking member, a stationary interiorly-toothed cracking member of substantially the form of the frustum of a hollow cone surrounding said conical member and having its opposite ends abutting against and bolted to vertical sides of said upright members; said concave surfaces surrounding said shaft each facing one end of said conical member and providing an unobstructed space around the shaft for the passage of grain to and between the toothed surfaces of said stationary and rotary members and outwardly therefrom.

2. A grain cracking machine comprising upright frame and casing members having confronting concave portions carrying centrally disposed shaft bearings, a shaft journaled in said bearings and having secured thereon and revoluble therewith a conical exteriorly-toothed grain cracking member, a stationary interiorly-toothed cracking member of substantially the form of the frustum of a hollow cone surrounding said conical member and having its opposite ends abutting against and bolted to the vertical sides of said upright frame and casing members; the teeth on said conical and stationary members being arranged in annular series, and the teeth on each member extending longitudinally thereof substantially parallel with the teeth on the other member and diametrically opposite teeth being arranged substantially in alinement with the shaft; the concave surfaces of said upright frame and casing members facing the ends of said conical grain cracking members so as to provide an unobstructed space around the shaft for the passage of grain to and between the toothed surfaces of said members and outwardly therefrom.

3. The combination, in a grain cracking machine, of a shaft carrying a rotary cracking member arranged within a hollow stationary cracking member each having substantially the form of the frustum of a cone; said stationary member having on its inner side and said rotary member having on its inclined periphery multiple annular series of substantially straight ribs of triangular form in cross-section extending longitudinally thereof; the ribs on one of said members being substantially parallel with the ribs on the other member and diametrically opposite ribs on each member arranged substantially in alinement with said shaft at an acute angle thereto; said conical member being rotatable in either forward or backward direction, so that when the teeth become worn or dull by rotation in one direction the motion can be reversed and a new cutting edge presented by rotation in the opposite direction.

4. The combination, in a grain cracking machine, of upright frame and casing members arranged in slightly separated relation and supporting therebetween a combined grain cracking and casing member having substantially the form of the frustum of a hollow cone interiorly toothed and having radially extending flanges at opposite ends thereof fitted against the vertical confronting sides of said combined frame and casing members, and fastening bolts or the like projecting from said confronting sides through openings in said flanges for securing said hollow cone member and said frame and casing members together, a driving shaft having its bearings on said upright casing members, and a peripherally-toothed grain cracking member fixed on said shaft within said hollow cone member; one of said upright casing members having a feed hopper thereon and the other provided with a discharge spout.

5. The combination, in a grain cracking machine, of upright frame and casing members arranged in slightly separated relation and supporting therebetween a combined grain cracking and casing member having substantially the form of the frustum of a hollow cone interiorly toothed and having radially extending flanges at opposite ends thereof fitted against the vertical confronting sides of said combined frame and casing members, and fastening bolts or the like projecting from said confronting sides through openings in said flanges for securing said hollow cone member and said frame and casing members together, a driving shaft having its bearings on said upright casing members, and a peripherally-toothed grain cracking member fixed on said shaft within said hollow cone member; one of said upright casing members having a feed hopper thereon and the other provided with a discharge spout; said hopper-carrying member having a concave portion surrounding said shaft co-extensive with and facing the smaller end of said stationary grain cracking member substantially flush with its inner toothed surface, so as to provide an open space around the shaft between it and said end through which grain may pass freely to and between the toothed surfaces of said stationary and revoluble members.

6. The combination, in a grain cracking machine, of upright frame and casing members arranged in slightly separated relation and supporting therebetween a combined grain cracking and casing member having substantially the form of the frustum of a hollow cone interiorly toothed and having radially extending flanges on opposite ends thereof fitted against the vertical confronting sides of said frame and casing members; said flanges having open-ended slots therein to receive fastening bolts or the like projecting from said confronting sides through said slots for securing said hollow cone member and said frame and casing members together, a shaft having its bearings on said upright casing members and a conical peripherally-toothed grain cracking member fixed on said shaft within said hollow cone member; one of said frame and casing members having a feed hopper thereon and the other provided with a discharge spout.

7. The combination, in a grain cracking machine, of upright frame and casing members arranged in slightly separated relation and supporting therebetween a combined grain cracking and casing member having substantially the form of the frustum of a hollow cone interiorly toothed and having radially extending flanges at opposite ends thereof fitted against the vertical confronting sides of said combined frame and casing members, and fastening bolts or the like projecting from said confronting sides through openings in said flanges for securing said hollow cone member and said frame and casing members together, a driving shaft having its bearings on said upright casing members and a peripherally-toothed grain cracking member fixed on said shaft within said hollow cone member; one of said upright casing members having a feed hopper thereon and the other provided with a discharge spout, and each having a concave portion surrounding said shaft and co-extensive with and facing one end of said rotary grain cracking member substantially flush with the inner toothed surface of said stationary grain cracking member so as to provide an open space around the shaft at each end of said rotary member.

8. The combination, in a grain cracking machine, of upright frame and casing members arranged in slightly separated relation and supporting therebetween a combined grain cracking and casing member having substantially the form of the frustum of a hollow cone interiorly toothed and having radially extending annular flanges on opposite ends thereof fitted in correspondingly shaped recesses in the vertical confronting sides of said frame and casing members; said flanges having open-ended slots therein to receive fastening bolts or the like projecting from said confronting sides through said slots for securing said hollow cone member and said frame and casing members together, and a rotary peripherally-toothed grain cracking member fixed on a driving shaft within said hollow cone member; one of said upright casing members having a feed hopper thereon and the other provided with a discharge spout, and each having a concave portion surrounding said shaft and facing the ends of said grain cracking members substantially flush with the inner toothed surface of said hollow cone member so as to provide an open space around the shaft between it and the toothed surfaces of said stationary and revoluble members at each end of the cone.

9. A grain cracking machine comprising upright frame and casing members having annular recesses in their confronting sides and supporting therebetween a combined grain cracking and casing member of substantially the form of the frustum of a hollow cone interiorly toothed and having radially extending annular flanges on opposite ends thereof fitted in said annular recesses in said frame and casing member; and fastening bolts or the like projecting from said confronting sides through said flanges for securing said hollow cone member and said frame and casing members together, a driving shaft having its bearings in said upright casing members and having secured thereon a peripherally-toothed grain cracking member arranged within said hollow cone member; one of said upright casing members having a feed hopper thereon and the other provided with a discharge spout, and each having a concave portion surrounding said shaft and facing the ends of said grain cracking members substantially flush with the inner toothed surface of said hollow cone member so as to provide an open space the shaft between it and said toothed surface at each end of the cone.

10. In combination, with a machine frame or casing comprising an upright casing member supporting a hopper and having on the inner side thereof a substantially concave centrally disposed portion, a second upright casing member having a discharge spout and movably supported in spaced relation to said hopper-supporting member, and an intermediate interiorly toothed casing member of substantially the form of the frustum of a hollow cone removably supported between said upright casing members, a shaft journaled in bearings supported on said upright casing members and carrying a cone-shaped peripherally-toothed or ribbed member arranged within said hollow cone member; the concave portion of said hopper-supporting member extending around said shaft and terminating substantially flush with the toothed surface of said hollow cone member at the smaller end of the cone; the upper portion of the casing member carrying the discharge spout being concave in form and its concave surface extending around said shaft and terminating substantially flush with the interiorly toothed surface of the larger end of said hollow cone member.

11. A grain cracking machine comprising a stationary combined grain cracking and casing member having substantially the the form of the frustum of a hollow cone with an interiorly toothed surface and secured to and between upright casing members, one of which has a feed hopper thereon and the other a discharge spout; a shaft having its bearings on said upright casing members, and a cone-shaped, peripherally-toothed grain cracking member adjustably secured on said shaft within said stationary member; the latter member having on opposite ends thereof radially extending flanges fitting flatwise against the inner vertical confronting sides of said upright casing members, and fastening bolts projecting from said sides through openings in said flanges for securing said stationary member and said upright members together.

12. In a grain cracking machine, a cracking member of substantially conical form having substantially straight ribs or teeth on the inclined surface thereof extending in the direction of its axis at an acute angle thereto and of triangular form in cross-section and inclined or beveled alike on both sides; said ribs being of different lengths and arranged in annular series, the ribs of one series being comparatively short and extending around the larger end of the cone and the ribs of each successive series being longer than those of the next preceding series.

13. In a grain cracking machine, a rotary grain cracking member of conical form arranged within a stationary cracking member having substantially the form of the frustrum of a hollow cone, each of said members having substantially straight ribs or teeth thereon extending in the direction of its axis at an acute angle thereto; said ribs being of triangular form in cross-section and inclined or beveled alike on both sides; the ribs on each member being of different lengths and arranged in annular series, the ribs of one series being comparatively short and extending around the larger end of the cone and the ribs of each successive series being longer than those of the next preceding series.

In testimony whereof I affix my signature.

SIMON SNYDER.